US008683263B2

(12) United States Patent
Louie et al.

(10) Patent No.: US 8,683,263 B2
(45) Date of Patent: Mar. 25, 2014

(54) COOPERATIVE CLIENT AND SERVER LOGGING

(75) Inventors: Darren Louie, Bellevue, WA (US); Jeroen Vanturennout, Snohomish, WA (US); Gaurav S. Anand, Seattle, WA (US); Kevin Michael Woley, Seattle, WA (US); Benjamin D. L. Stewart, Seattle, WA (US); Donovan P. Regan, Seattle, WA (US); George Joy, Kirkland, WA (US); Matthew R. Ayers, Seattle, WA (US); Sachin Jagadish Patil, Issaquah, WA (US); Basel Abdus Salam, Bellevue, WA (US); Mohammad Saifur Rahman, Redmond, WA (US); Kandarp Dinesh Jani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 13/229,557

(22) Filed: Sep. 9, 2011

(65) Prior Publication Data
US 2013/0067288 A1 Mar. 14, 2013

(51) Int. Cl.
*G06F 11/00* (2006.01)
(52) U.S. Cl.
USPC .................... 714/18; 714/25; 714/43; 714/49
(58) Field of Classification Search
USPC .......................................... 714/18, 25, 43, 49
See application file for complete search history.

(56) References Cited

U.S. PATENT DOCUMENTS

| | | | |
|---|---|---|---|
| 7,020,683 B2 | 3/2006 | Newsome | |
| 7,076,400 B2 | 7/2006 | Dulberg et al. | |
| 7,506,314 B2 | 3/2009 | Kollmann et al. | |
| 7,783,931 B2 * | 8/2010 | Coronado et al. | 714/43 |
| 7,793,158 B2 * | 9/2010 | Arimilli et al. | 714/43 |
| 2003/0070114 A1 * | 4/2003 | Yasuda | 714/20 |
| 2004/0193941 A1 * | 9/2004 | Barr et al. | 714/4 |
| 2004/0260973 A1 * | 12/2004 | Michelman | 714/13 |
| 2006/0206539 A1 | 9/2006 | Thompson | |
| 2007/0027974 A1 * | 2/2007 | Lee et al. | 709/223 |
| 2008/0005119 A1 * | 1/2008 | Fernandez et al. | 707/10 |
| 2009/0070639 A1 * | 3/2009 | Langford et al. | 714/57 |
| 2009/0282297 A1 | 11/2009 | Anna et al. | |
| 2010/0174774 A1 | 7/2010 | Kern et al. | |
| 2011/0029484 A1 | 2/2011 | Park et al. | |

OTHER PUBLICATIONS

Kent, et al., "Guide to Computer Security Log Management", Retrieved at <<http://csrc.nist.gov/publications/nistpubs/800-92/SP800-92.pdf>>, From National Institute of Standards and Technology (NIST), Sep. 2006, pp. 72.
"Startup Howto", Retrieved at <<http://www.irssi.org/documentation/startup>>, Retrieved Date: Jun. 10, 2011, pp. 13.
"Changing the Log Level Programmatically in Log4net", Retrieved at <<http://stackoverflow.com/questions/650694/changing-the-log-level-programmaticaly-in-log4net>>, Retrieved Date: Jun. 10, 2011, pp. 3.

* cited by examiner

*Primary Examiner* — Charles Ehne
(74) *Attorney, Agent, or Firm* — Sung Kim; Andrew Sanders; Micky Minhas

(57) ABSTRACT

Various embodiments enable automatic cooperative logging of information associated with a connection between at least two computing devices. In some cases, a first computing device can automatically trigger logging on a second computing device upon detection of at least one scenario. Alternately or additionally, the second computing device can respond to the first computing device with additional and/or supplemental logging requests.

17 Claims, 5 Drawing Sheets

COOPERATIVE CLIENT AND SERVER LOGGING

BACKGROUND

A typical working environment for a computing device includes a network, or some other form of connectivity, that the computing device uses to share and acquire information. The computing device typically connects to one or more other computing devices to access services, navigate the Web, send and receive e-mail, and the like. One such scenario involves the computing device connecting to a server. However, a connection between the computing device and server can sometimes encounter problems and/or failures. To aid in failure analysis, the computing device and/or the server can maintain a log that describes what actions have transpired during the connection, what steps occurred during an attempt to connect, what steps occurred during a disconnect, etc.

Since a server and computing device have finite memory space, measures are taken to balance how much information the log retains. In some cases, when logging is continuously on, the log may maintain a rolling window of information (i.e. as new information gets pushed into the log, old information gets pushed out.) With a rolling window, the amount of information contained within the log stays the same, but is constantly updating. Thus, after a certain amount of time, information is lost. In other cases, logging may only start when notification occurs, for example, when manually started and/or when triggered. However, if a problem is not noticed at the time of failure, there can be a delay in when logging is started, subsequently causing pertinent information to be lost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable automatic cooperative logging of information associated with a connection and/or transactions between at least two computing devices. In some cases, a first computing device can automatically trigger logging on a second computing device. Alternately or additionally, the second computing device can respond to the first computing device with additional and/or supplemental logging requests.

BRIEF DESCRIPTION OF THE DRAWINGS

The same numbers are used throughout the drawings to reference like features.

DETAILED DESCRIPTION

Overview

Various embodiments enable automatic cooperative logging of information associated with a connection and/or transactions between at least two computing devices. The computing devices can cooperatively request logging from each other at select times, such as times before, during, and/or after a connection between the computing devices. In some cases, a first computing device can automatically initiate logging on a second computing device upon detection of at least one scenario. In other cases, the first computing device can modify a level of logging on a currently running log process on the second computing device. Similarly, the second computing device can respond to the first computing device with its own request for logging on the first computing device, such as initiating logging and/or modifying an existing log process. In some embodiments, a third computing device can be used to analyze one or more logs from the computing devices.

In the discussion that follows, a section entitled "Operating Environment" is provided and describes one environment in which one or more embodiments can be employed. Following this, a section entitled "Automated Cooperative Logging" describes how at least two computing devices can automatically enable logging of diagnostic information. Last, a section entitled "Example System" describes an example system that can be utilized to implement one or more embodiments.

Having provided an overview of various embodiments that are to be described below, consider now an example operating environment in which one or more embodiments can be implemented.

Operating Environment

Figure 1:
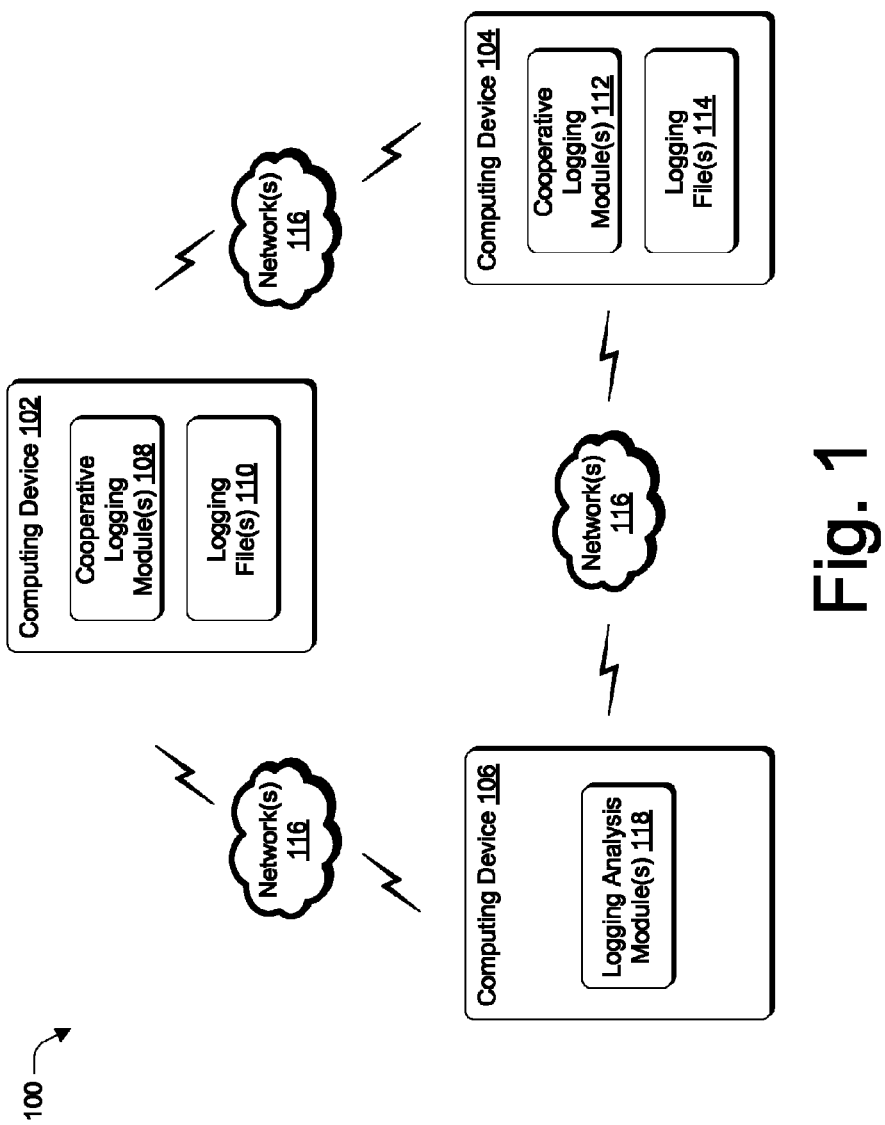
FIG. 1 illustrates an operating environment in which various principles described herein can be employed in accordance with one or more embodiments.

FIG. 1 illustrates an operating environment in accordance with one or more embodiments, generally at 100. Environment 100 includes computing devices 102, 104, and 106. Computing devices 102, 104, and 106 may be configured in a variety of ways. For example, a computing device may be configured as a traditional laptop computer, a traditional desktop computer, a mobile phone, a Personal Digital Assistant (PDA), a net book, a server, a client device, a set-top box, a gaming device, and so forth. Thus, computing devices 102, 104, and 106 can be any form of computing device that includes the ability to make an internal and/or external connection.

In this example, computing device 102 represents a server computing device, computing device 104 represents a client computing device, and computing device 106 represents an analysis computing device. It is to be appreciated and understood, however, that any combination of computing devices can be used without deviating from the spirit of the claimed subject matter. For example, in some embodiments, computing device 106 may not be present and/or its functionality can be implemented by one of the other computing devices. In other embodiments, the computing devices can all be server computing devices or all client computing devices. In some cases, one computing device can be configured to track internal connections, rather than different computing devices configured to track external connections as illustrated in FIG. 1.

Computing device 102 include one or more cooperative logging module(s) 108 and one or more logging file(s) 110. Similarly, computing device 104 includes one or more cooperative logging module(s) 112 and one or more logging file(s) 114. Cooperative logging module(s) 108/112 represent functionality that enables a computing device to automatically send and receive requests associated with coordinating logging information about a connection between one or more computing device. Cooperative logging module(s) 108/112 can also represent functionality that enables various levels of logging (i.e. how much information is logged, what kind of information is logged, etc.). Cooperative logging module(s) 108/112 can be implemented as an independent, stand-alone module, or integrated into an application and/or operating system (OS).

Logging file(s) 110/114 represent one or more files that include logged information, as further described below. In some embodiments, logging file(s) can include synchronization information to enable multiple log files from multiple computing devices to be aligned, as further described below.

Environment 100 also includes a network 116 which represents one or more data communication networks and/or links. For example, the network 116 may include a wide area network (WAN), a local area network (LAN), a wireless network, an intranet, the Internet, and so on. In this example, FIG. 1 illustrates network 116 as an external connection between computing device 102 and 104, computing device 104 and 106, and computing device 106 and 102.

Computing device 106 includes one or more logging analysis module(s) 118. Logging analysis module(s) 118 represents functionality that can acquire and/or store one or more logging file of a computing device, such as logging file(s) 110 and/or 114. In some cases, logging analysis module(s) 118 can further analyze and/or synchronize the logs, and identify associated behavior. For example, logging analysis module(s) can be configured to identify a failure mechanism based upon the logs.

Having described an example operating environment, consider now a discussion of automated cooperative logging between computing devices.

Automated Cooperative Logging

Technology today enables multiple computing devices to connect with one another. When the connection works, the computing devices can exchange data back and forth. Unfortunately, various aspects of the connection can fail due to several reasons. For example, the connection can fail to be established, an interrupt can occur in the middle of a data exchange over the connection (causing data exchange failures), a disconnect between the computing devices may not be clean, device interactions can be faulty and/or malfunctioning, etc. One way to diagnose a failure is to capture information associated with abnormal and/or unexpected behavior. In order to do this, logging should be enabled in time to capture relevant information. This can either happen manually, where a user notices an issue and initiates the logging process, or logging can be continuously running and storing a finite amount of information to a file. In either case, there exists a risk of missing the relevant information.

Various embodiments enable automatic cooperative logging of information associated with a connection and/or transactions between at least two computing devices. For example, a first computing device may detect an issue with a connection to a second computing device. In response to detecting the issue, the first computing device can initiate logging in the second computing device and/or modify existing logging in the second computing device. The second computing device can, in turn, respond to the first computing device's request with a request of its own to initiate and/or modify logging on the first computing device. In this manner, the first and second computing devices cooperatively acquire information associated with the connection.

Figure 2:
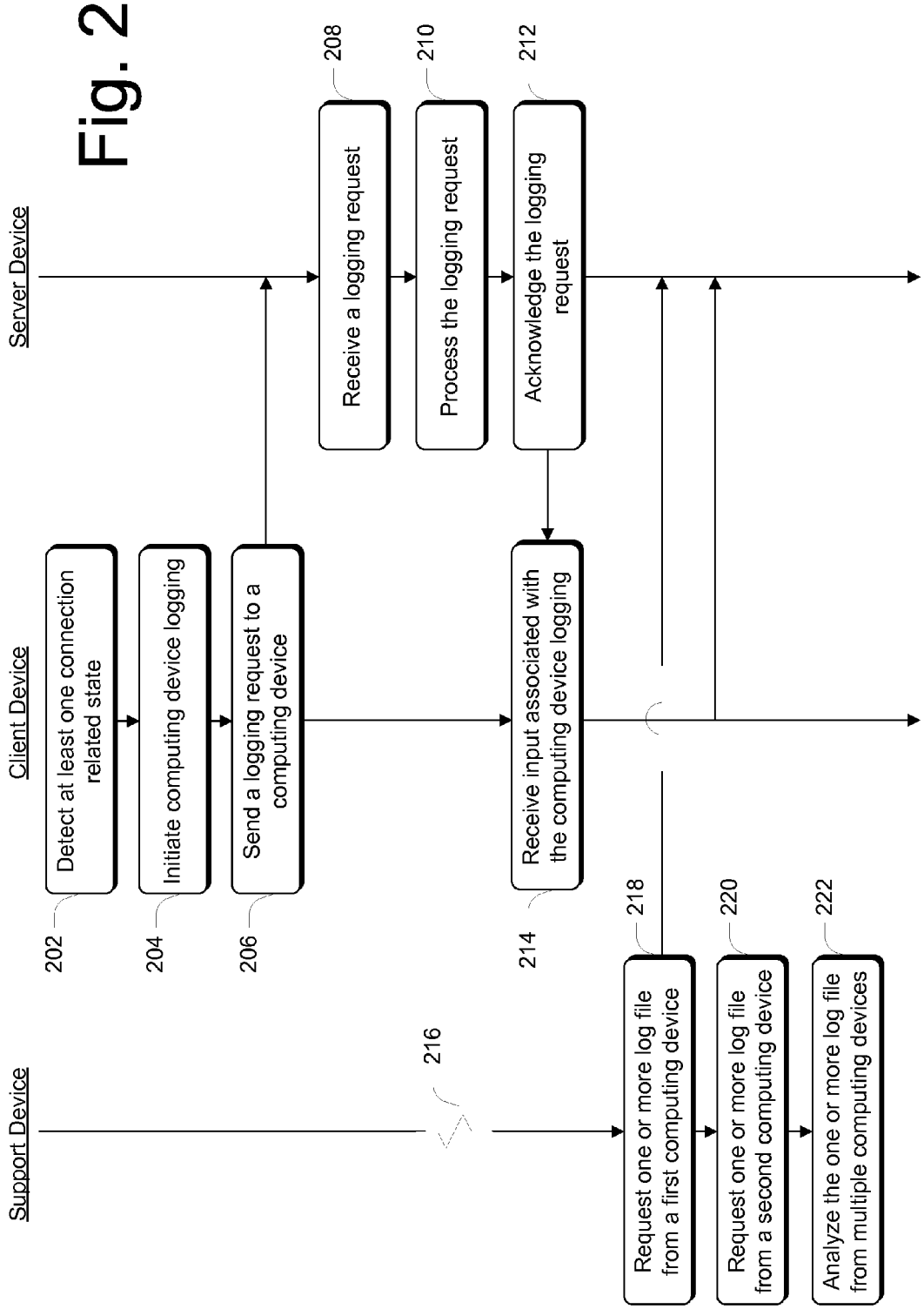
FIG. 2 is a flow diagram that describes steps in a method in accordance with one or more embodiments.

Consider FIG. 2, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as cooperative logging modules 108 and/or 112, as well as logging analysis module 118, of FIG. 1. In the discussion that follows, the method is broken out in the flow diagram in three different columns. These columns are utilized to represent the various entities that can perform the described functionality. Accordingly, the column labeled "Support Device" include acts that are performed by a suitably-configured support computing device. Likewise, the columns labeled "Client Device" and "Server Device" include acts that are performed by a suitably-configured client computing device and server computing device, respectively. While FIG. 2 illustrates interactions between a client device and a server device, it is to be appreciated and understood that the concepts described here in can be applied to transactions between any combination of devices without departing from the spirit of the claimed subject matter. For example, the devices can comprise two or more client devices, two or more server devices, one client device and two server devices, and so forth.

Step 202 detects at least one connection related state. For example, the connection state can be detected programmatically and without user intervention. In some embodiments, the connection state can be related this can be a connection failure, such as a failure to connect, a failure to disconnect cleanly, lost data packets, etc. Alternately or additionally, the connection state can be related to a certain sequence of events, such as repeated login attempts that fail, handshaking logic errors, data exchange errors, distributed algorithm failures, etc. In this particular example, the connection state is associated with a communication link between a client device and a server device. However, as described above, it is to be appreciated and understood that the communication link can be between any combination of computing devices without departing from the spirit of the claimed subject matter (e.g., a smart phone synchronizing with a computing device, a set top-box in communication with a distribution service, etc.).

Responsive to detecting at least one connection related state, step 204 initiates a logging process. As in step 202, this can be achieved programmatically and without user intervention. In some embodiments, initiating client device logging can include starting a logging process and/or modifying a currently running logging process on the client device. Any suitable type of information can be included in a log, such as a time stamp, a message identifier (ID), a synchronization marker (e.g. an identifier configured to correlate multiple logs), a payload of one or more message, handshake information associated with the communication link, address information, client device identifier information, server device identifier information, communication link type, and so on.

Step 206 sends a logging request to a computing device. In this example, the computing device is a server device. As in step 202 and 204, this can be achieved programmatically and without user intervention. In some embodiments, the logging request can indicate a level of logging and/or a duration of time to retain logging information. The level of logging can specify a more detailed level of logging, a less detailed level of logging, a more specific type of logging, etc. Any suitable type of information can be logged, such as a number of failed operations and/or attempts, transaction and/or message identification (ID) information, time duration between transactions, and the like. Alternately or additionally, the logging request can specify one or more particular transactions about which to log information. The logging request can also include additional information, such as the synchronization marker used by the client device described above. In some embodiments, the request can comprise one message or several messages. While not illustrated here, in some embodiments, a message can be sent to a third party as notification of a potential communication issue, such as a support device.

Step 208 receives a logging request. Responsive to receiving the logging request, step 210 processes the logging request. In some embodiments, processing the logging request can include marking one or more log files as files to retain for an extended and/or indefinite period. For example, a server device can be configured to purge old information in a log file as new information is added. By marking a file as one to retain, the old information will be saved rather than purged. Alternately or additionally, processing the logging request can include initiating and/or adding additional logging. In some cases, the additional logging can be specific to one or more transactions identified in the request. For example, the additional logging can log information associated with a particular client device and/or a particular connection to the client device. When the logging request includes a synchronization marker, the receiving computing device (represented here as the server device) can include the synchronization marker to aid in synchronizing logs from multiple computing devices. In some cases, processing the log request can entail setting a timeout associated with how long to log information.

Responsive to processing the logging request, step 212 acknowledges the logging request. In some embodiments, the acknowledgement can be configured as a message requesting the initiating computing device (represented here as the client device) to log information at a certain level. This can include more information being logged, less information being logged, identifying particular types of transactions to log associated information about, a set amount of time to run logging, etc. In some embodiments, the acknowledgement can include an identifier generated by the server device to aid in correlating logging information between the multiple devices. For example, instead of the client device generating a synchronization marker as described above, the server device can generate the synchronization marker.

Step 214 receives input associated with the computing device logging. As described above, the input can include a request for the computing device logging to log at a certain level, can include an acknowledgment to previous logging requests (such as that described in step 212), etc. As in the previous steps, step 214 can be achieved programmatically and without user intervention.

In some embodiments, a support device can be configured to request logging information from the multiple devices. This can happen after the passing of any amount of time after the logs are captured. Line 216 represents an arbitrary amount of time between when logging has completed on the client device and a server device, and when the support device requests the log(s) for analysis purposes. This can be any amount of time, such as one or more seconds, an hour, a day, a week, and so forth.

Step 218 requests one or more log file from a first computing device. Alternately or additionally, a device can push and/or automatically send the one or more logs to the support device. Step 220 requests one or more log file from a second computing device. In this particular example, the first and second computing devices are the server and client devices, respectively. The order in which logs are requested can be any suitable order. For example, client device log files can be requested first. In some embodiments, information acquired from log files associated with the first computing device can be used when a requesting a log file from the second computing device, as further described below.

Responsive to receiving one or more log files, step 222 analyzes the log file(s) from multiple computing devices. This can include parsing the log files for a synchronization marker. In some embodiments, a log file from the first computing device can be analyzed before requesting a log file from the second computing device. Consider an example where a log file is requested from a first computing device, such as described in step 218. A synchronization marker can be parsed from the log file, and used in a request to the second computing device to acquire specific information. Accordingly, steps 218, 220, and 222 can be executed in different orders without departing from the spirit of the claimed subject matter. Additionally, different computing devices can initiate the cooperative logging process, as further described below.

Figure 3:
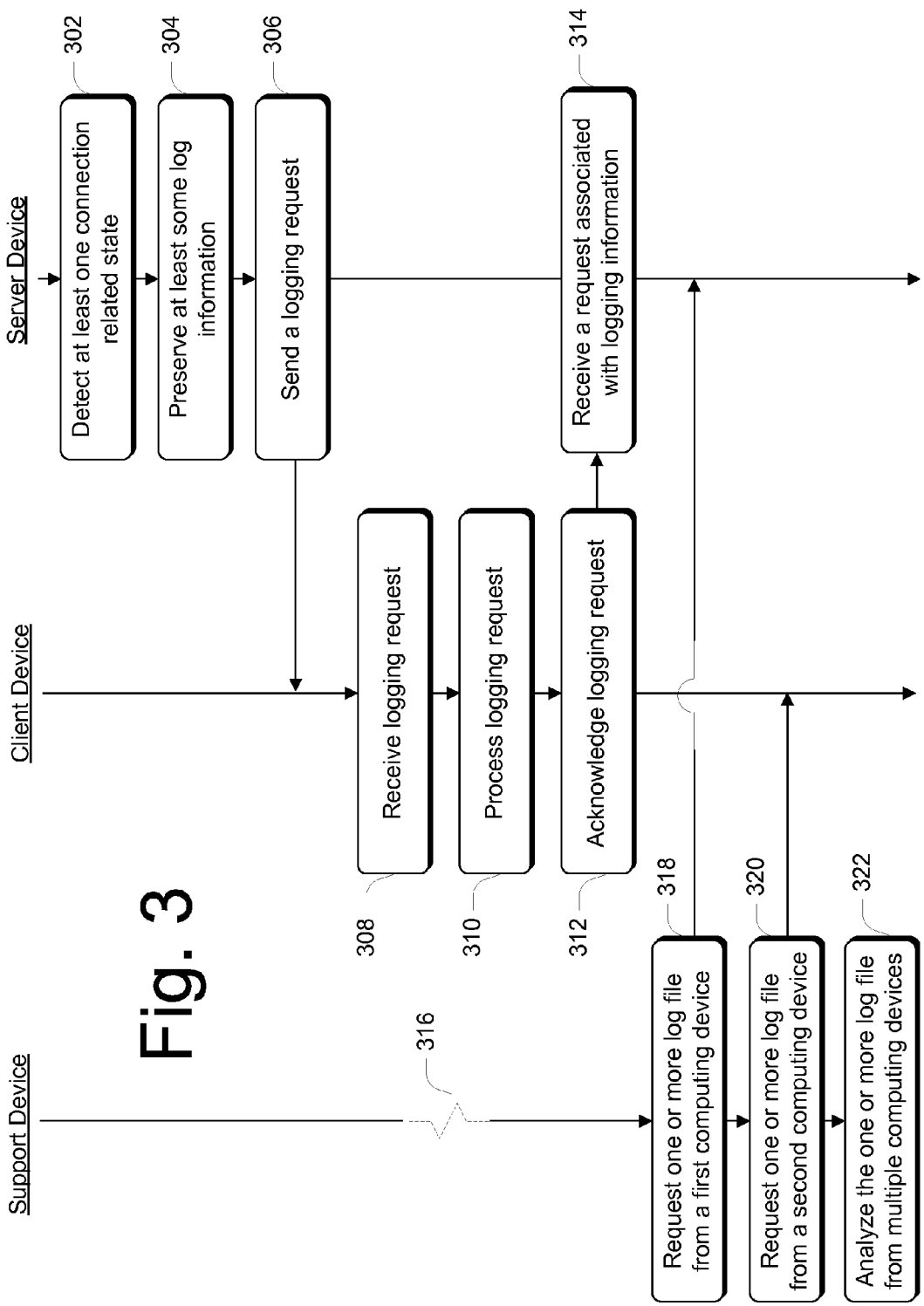
FIG. 3 is a flow diagram that describes steps in a method in accordance with one or more embodiments.

Consider FIG. 3, which describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as cooperative logging modules 108 and/or 112, as well as logging analysis module 118 of FIG. 1. As in the case of FIG. 2, the method is broken out in the flow diagram in three different columns labeled "Support Device", "Client Device", and "Server Device". Similar to what was described above related to FIG. 2, it is to be appreciated and understood that the concepts described here in can be applied to transactions between any combination of devices without departing from the spirit of the claimed subject matter.

Step 302 detects at least one connection related state. In this example, the connection state is related to a communication link between a server computing device and a client computing device. Here, the state of the connection is detected by the server computing device. As in the case of FIG. 2, this can be detected programmatically, and can include a variety of states, examples of which are provided above.

Responsive to detecting at least one connection related state, step 304 preserves at least some log information. For example, the computing device can save one or more log file to a separate location from a default location, one or more log file can be marked as file(s) to retain, the requested log information can be redirected to a different file, and the like. As in steps described above, this can be achieved without user intervention. In some cases, the log information to preserve can be identified by one or more criteria, such as log information pertaining to a particular computing device, information pertaining to a particular communication link command (connect, disconnect, send, receive, etc.), and the like. Preserving the log information can be configured to only preserve log information logged over a finite amount of time (e.g. preserve the information logged over "x" number of seconds) or configured for a more arbitrary amount of time (e.g. log information until a "stop" command is received).

Step 306 sends a logging request. In some embodiments, the logging request can be configured to activate and/or initiate logging on the computing device. In other embodiments, the logging request can be configured to modify existing logging. Similar to step 206 of FIG. 2, the logging request can comprise one or more messages, can include information to configure what information gets logged (such as requesting what depth or amount of information to log), additional debugging information (e.g. synchronization marker(s), etc.), as well as including notification of a potential communication link issue.

Step 308 receives a logging request. In this example, the logging request is received from the server computing device by the client device. It is to be appreciated and understood, however, that the logging request can be received from any suitable computing device, examples of which are provided above. Responsive to receiving the logging request, step 310 processes the logging request. Processing the logging request can include initiating a logging process, modifying a logging process, etc.

Responsive to processing the logging request, step 312 acknowledges the logging request. In some embodiments, the logging request can comprise one or more messages, and can include additional information and/or requests associated with logging, examples of which are provided above.

Step 314 receives a request associated with logging information. For example, the request can be configured to request a certain level of logging. In this particular example, the client device responds to the server device with a logging request of its own. In this manner, the client and server devices cooperate with one another in order to attain more complete logging information.

As in the case of FIG. 2, a support device can be configured to request logging information from multiple devices. This can happen at any amount of time after the logs are captured, indicated here by line 316. Step 318 requests one or more log file from a first computing device, while step 320 requests one or more log file from a second computing device. In this example, the first computing device is represented as the server computing device, while the second computing device is represented as the client computing device. Step 322 analyzes the one or more log file from the multiple devices. This can include acquiring all log files prior to analyzing, acquiring at least one log file and analyzing content of the file(s) to base further log file requests off of (such as acquiring a synchronization marker), or any combination thereof. Acquiring at least one log file from each participant in the communication link enables the support device to get a full view of a particular exchange, thus enabling a more thorough diagnosis.

Accordingly, the logging process is a cooperative process. Any involved device (e.g. one or more client devices, one or more server devices, etc.) has an ability to affect the logging process. Each involved device can initiate a logging sequence, modify the logging sequence, and/or request additional information in response to a logging request.

Having considered automatic cooperative logging between computing devices, consider now a discussion of an example system in accordance with one or more embodiments.

Example System

Figure 4:
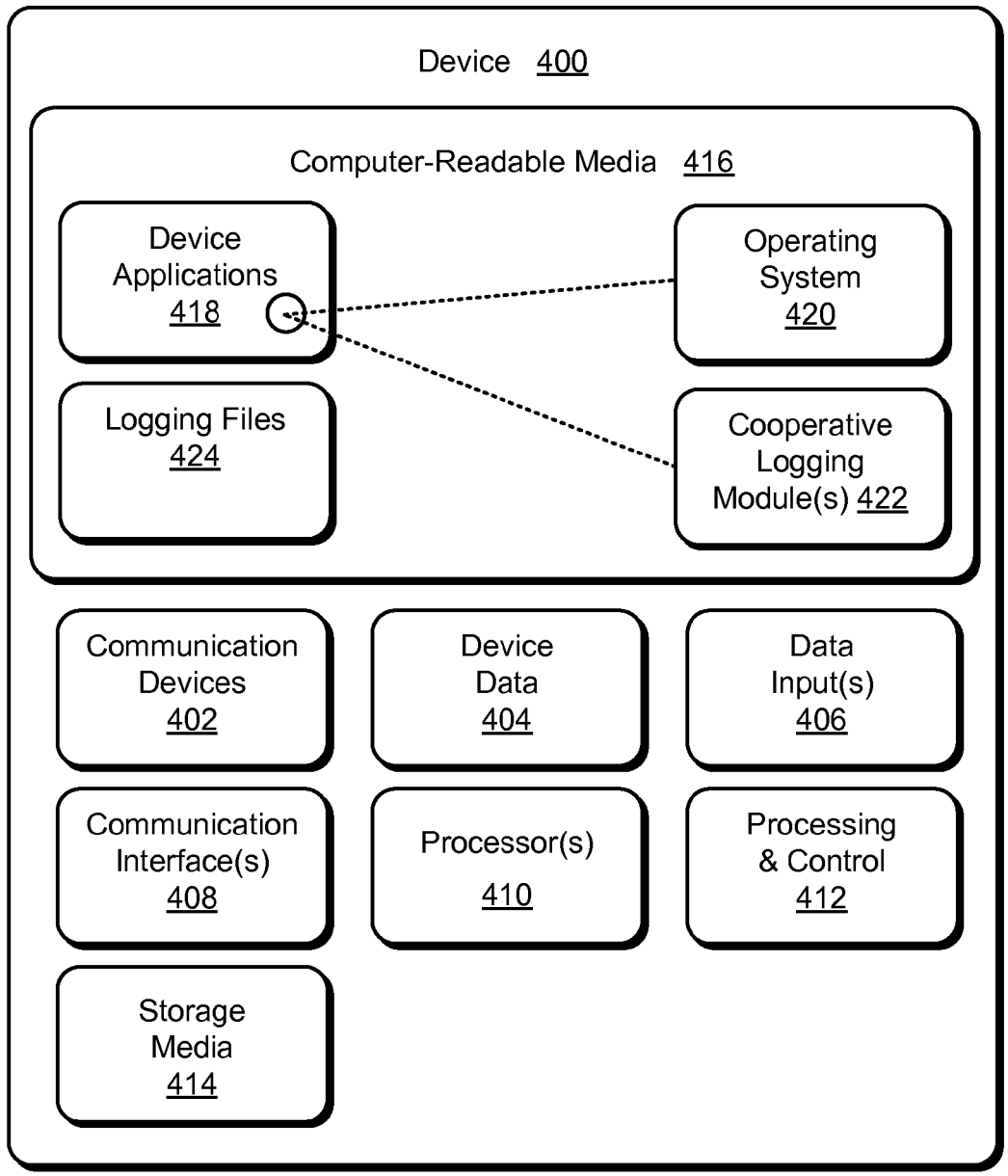
FIG. 4 illustrates an example system that can be utilized to implement one or more embodiments.
Figure 5:
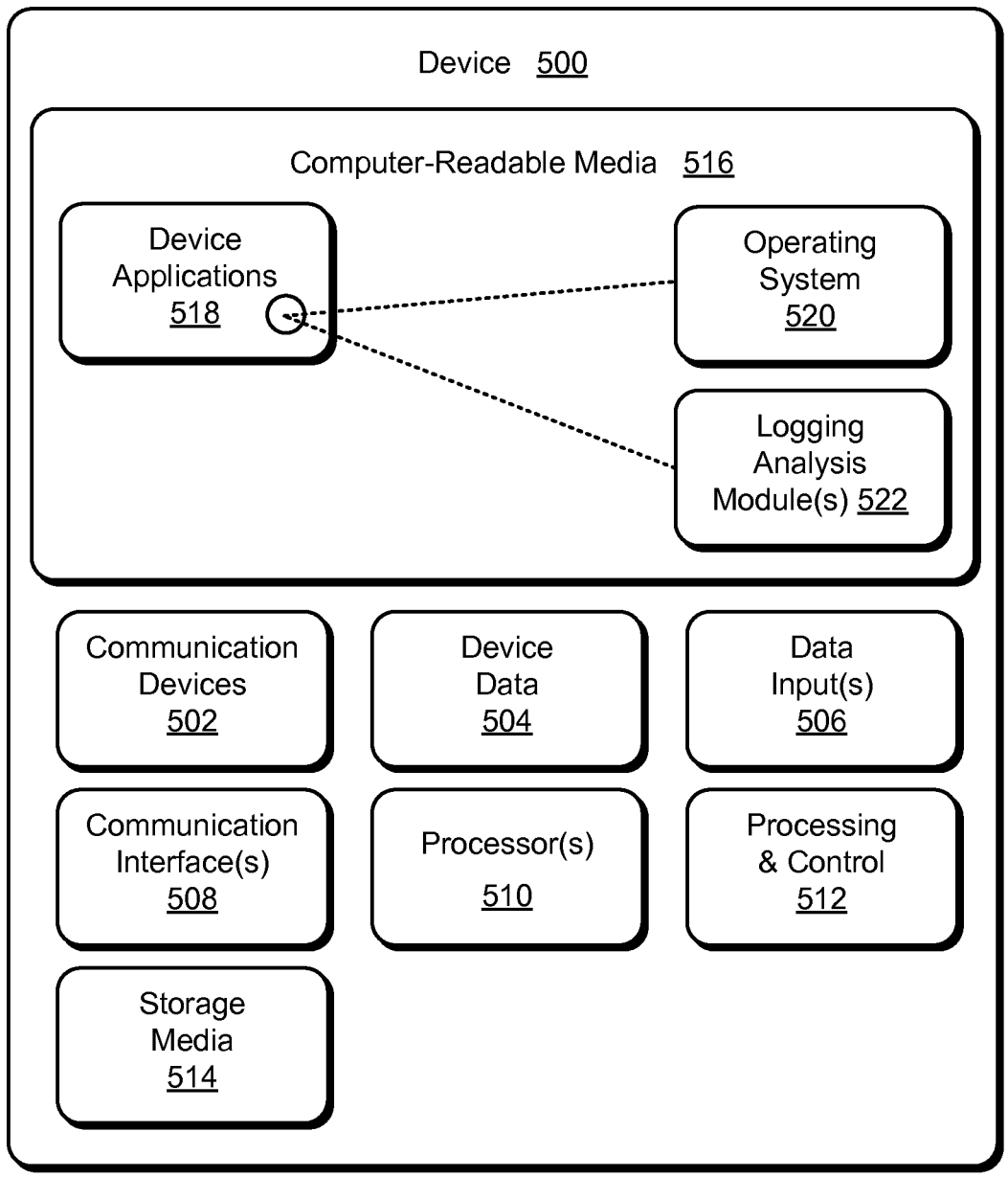
FIG. 5 illustrates an example system that can be utilized to implement one or more embodiments

FIG. 4 illustrates various components of an example device 400 that can be implemented as any type portable and/or computer device as described above with reference to devices 102 and 104 in FIG. 1. FIG. 5 illustrates various components of an example device 500 that can be implemented as any type of portable and/or computer device as described with reference to device 106 in FIG. 1. For the purposes of brevity, FIG. 4 and FIG. 5 will be described together. Components associated with FIG. 4 will be identified as components prefixed with "4XX", while components associated with FIG. 5 will be identified as components prefixed with "5XX".

Devices 400, 500 includes communication devices 402, 502 that enable wired and/or wireless communication of device data 404, 504 (e.g., received data, data that is being received, data scheduled for broadcast, data packets of the data, etc.). The device data 404, 504 or other device content can include configuration settings of the device, media content stored on the device, and/or information associated with a user of the device. Media content stored on devices 400, 500 can include any type of audio, video, and/or image data. Devices 400, 500 includes one or more data inputs 406, 506 via which any type of data, media content, and/or inputs can be received, such as user-selectable inputs, messages, music, television media content, recorded video content, and any other type of audio, video, and/or image data received from any content and/or data source. User-selectable inputs include one or more input mechanisms by which a user can interact with the device. A user-selectable input mechanism can be implemented in any suitable way, such as a keyboard, a button, a stylus, a touch screen, a mouse, voice input, and the like.

Devices 400, 500 also include communication interface(s) 408, 508 that can be implemented as any one or more of a serial and/or parallel interface, a wireless interface, any type of network interface, a modem, and as any other type of communication interface. The communication interface(s) 408, 508 provide a connection and/or communication links between devices 400, 500 and a communication network by which other electronic, computing, and communication devices communicate data with devices 400, 500.

Device 400, 500 includes one or more processors 410, 510 (e.g., any of microprocessors, controllers, and the like) which process various computer-executable or readable instructions to control the operation of devices 400, 500 and to implement the link expansion functionality as described above. Alternatively or additionally, devices 400, 500 can be implemented with any one or combination of hardware, firmware, or fixed logic circuitry that is implemented in connection with processing and control circuits which are generally identified at 412, 512. Although not shown, devices 400, 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Devices 400, 500 also include computer-readable hardware storage media 414, 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 416, 516 provides data storage mechanisms to store the device data 404, 504, as well as various device applications 418, 518 and any other types of information and/or data related to operational aspects of device 400, 500. For example, an operating system 420, 520 can be maintained as a computer application with the computer-readable media 416, 516 and executed on processor(s) 410, 510. The device applications 418, 518 can include a device manager (e.g., a control application, software application, signal processing and control module, code that is native to a particular device, a hardware abstraction layer for a particular device, etc.). The device applications 418, 518 also include any system components or modules to implement embodiments of obtaining link information as described herein.

With respect to device 400, the device applications 418 include cooperative logging module(s) 422 that initiate logging request(s) to another computing device, as well as receive and respond to logging request(s). With respect to device 500, the device applications 518 include logging analysis module(s) 522. Logging analysis module(s) 522 is representative of software that is configured to acquire, synchronize, and/or process log files from multiple computing devices. In some embodiments, logging analysis module(s) 522 can process two sides of a communication link. Modules 422 and 522 are shown as software modules and/or computer applications. Alternatively or in addition, cooperative logging module(s) 422 and/or logging analysis module(s) 522 can be implemented as hardware, software, firmware, or any combination thereof.

CONCLUSION

Various embodiments enable automatic cooperative logging of information associated with a connection between at least two computing devices. In some cases, a first computing device can automatically trigger logging on a second computing device upon detection of at least one particular scenario. Alternately or additionally, the second computing device can respond to the first computing device with additional and/or supplemental logging requests.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    detecting, without user intervention, at least one connection related state associated with communication between a first computing device and a second computing device;
    initiating, without user intervention, a logging process on the first computing device, the logging process being associated with said at least one connection related state;
    sending, without user intervention, a logging request to the second computing device responsive to detecting said at least one connection related state; and
    receiving, from the second computing device and without user intervention, input associated with the logging process on the first computing device, the receiving input associated with the logging process further comprising receiving input specifying a request for a more detailed level of logging.

2. The computer-implemented method of claim 1, the detecting at least one connection related state comprising detecting a communication failure.

3. The computer-implemented method of claim 1, the sending a logging request to the second computing device further comprising specifying a transaction about which to log information.

4. The computer-implemented method of claim 1, the sending a logging request to the second computing device further comprising specifying a duration of time to retain log information on the second computing device.

5. A computer-implemented method comprising:
    detecting, without user intervention, at least one connection related state associated with communication between a client computing device and a server computing device;
    responsive to said detecting, and without user intervention, preserving log information on the server computing device, the log information being associated with said at least one connection related state;
    responsive to said detecting, and without user intervention, sending a logging request to the client computing device, the sending a logging request to the client computing device further comprising specifying a level of information for the client computing device to log information; and
    receiving a request associated with logging information at the server computing device.

6. The computer-implemented method of claim 5, the preserving log information on the server computing device further comprising redirecting transaction information associated with the client computing device to a separate location from a default location.

7. The computer-implemented method of claim 5, the at least one connection related state being associated with a sequence of events.

8. The computer-implemented method of claim 5, the receiving a request associated with logging information further comprising receiving information specifying a level of information for the server computing device to log information.

9. The computer-implemented method of claim 5, the method further comprising:
    receiving, from a different computing device, a request for the log information; and
    responsive to receiving the request for the log information, sending at least some log information to the different computing device.

10. One or more computer-readable hardware storage media comprising computer readable instructions which, when executed, implement:
    a cooperative logging module configured to, without user intervention:
        detect at least one connection related state associated with communication between computing devices;
        generate an identifier configured to enable synchronization of log information between the computing devices;
        initiate logging of information associated with the at least one connection related state on a first computing device of the computing devices, the log information on the first computing device configured to include the identifier; and
        cause initiation of logging of information associated with the at least one connection related state on a second computing device of the computing device, the log information on the second computing device configured to include the identifier;
    the cooperative logging module further configured to preserve logged information based, at least in part, on one or more criteria.

11. The one or more computer-readable hardware storage media of claim 10, the one or more criteria comprising criteria specifying a communication link command.

12. The one or more computer-readable hardware storage media of claim 10, the cooperative logging module further configured to preserve log information specified over finite amount of time.

13. The one or more computer-readable hardware storage media of claim 10, the one or more criteria comprising criteria specifying transactions associated with a particular communication link on a particular computing device.

14. A computer-implemented method comprising:
    detecting, without user intervention, at least one connection related state associated with communication between a first computing device and a second computing device;

initiating, without user intervention, a logging process on the first computing device, the logging process being associated with said at least one connection related state and comprising:
  logging a synchronization marker into log information; and
  logging handshake information associated with communication between the first and second computing devices into the log information;
sending, without user intervention, a logging request to the second computing device responsive to detecting said at least one connection related state; and
receiving, from the second computing device and without user intervention, input associated with the logging process on the first computing device.

15. The computer-implemented method of claim 14, the sending the logging request to the second computing device further comprising sending the synchronization marker to the second computing device.

16. A computer-implemented method comprising:
  detecting, without user intervention, at least one connection related state associated with communication between a client computing device and a server computing device;
  responsive to said detecting, and without user intervention, preserving log information on the server computing device, the log information being associated with said at least one connection related state;
  responsive to said detecting, and without user intervention, sending a logging request to the client computing device, the sending a log request to the client computing device further comprising sending the log request with a synchronization marker; and
  receiving a request associated with logging information at the server computing device.

17. One or more computer-readable hardware storage media comprising computer readable instructions which, when executed, implement:
  a cooperative logging module configured to, without user intervention:
    detect at least one connection related state associated with communication between computing devices;
    generate an identifier configured to enable synchronization of log information between the computing devices;
    initiate logging of information associated with the at least one connection related state on a first computing device of the computing devices, the log information on the first computing device configured to include the identifier; and
    cause initiation of logging of information associated with the at least one connection related state on a second computing device of the computing device, the log information on the second computing device configured to include the identifier;
  the cooperative logging module further configured to:
    receive a request from the second computing device configured to specify a level at which to log information on the first computing device.

* * * * *